United States Patent [19]

Nimura et al.

[11] Patent Number: 4,939,662
[45] Date of Patent: Jul. 3, 1990

[54] NAVIGATION APPARATUS

[75] Inventors: Mitsuhiro Nimura; Shoji Yokoyama, both of Anjo, Japan

[73] Assignees: Aisin AW Co., Ltd., Anjo; Kabushiki Kaisha Shinsangyokai Hatsu, Tokyo, both of Japan

[21] Appl. No.: 217,531

[22] Filed: Jul. 11, 1988

[30] Foreign Application Priority Data

Oct. 7, 1987 [JP] Japan ................ 62-173612

[51] Int. Cl.⁵ ............................ G06F 15/50
[52] U.S. Cl. .................... 364/449; 340/990; 340/995
[58] Field of Search ........ 364/443, 444, 449, 424.02, 364/460, 436; 73/178 R; 340/988, 990, 995; 369/21

[56] References Cited

U.S. PATENT DOCUMENTS

| | | | |
|---|---|---|---|
| 4,291,373 | 9/1981 | Mizote et al. | 369/21 |
| 4,490,717 | 12/1984 | Saito | 364/460 |
| 4,630,209 | 12/1986 | Saito et al. | 364/449 |
| 4,679,147 | 7/1987 | Tsujii et al. | 364/449 |
| 4,688,176 | 8/1987 | Hirata | 364/449 |
| 4,774,671 | 9/1988 | Itoh et al. | 364/444 |
| 4,812,845 | 3/1989 | Yamada et al. | 340/995 |

Primary Examiner—Gary Chin
Attorney, Agent, or Firm—Varndell Legal Group

[57] ABSTRACT

A navigation apparatus for navigating a vehicle in accordance with a preset course while measuring distance travelled and steering angle is characterized by presetting distance information for guidance along the course, and outputting guidance relating to the pertinent distance information in the form of travelling conditions corresponding to the preset distance information. Distance information for guiding a driver along the course is preset. Therefore, even if it is a long distance to an intersection at which the next turn is to be made, whenever the vehicle has traveled a fixed distance the driver is unfailingly supplied with distance information relating to the intersection at which the next turn is to be made and with distance information relating to distinguishing features seen along the course, such as facilities and scenery, during the time the vehicle is travelling between the intersections. Thus, if a long distance must be travelled to reach the intersection at which the next turn is to be made, the driver is frequently supplied with guidance relating to distance information while travelling. This makes it possible for the driver to verify the course and assures that the driver can drive the vehicle at ease without requiring that he be aware of the distance to the intersection at which the next turn is to be made.

16 Claims, 7 Drawing Sheets

FIG. 5B

| INTERSECTION NO. | INTERSECTION NAME | SMALLEST NO. OF ROAD HAVING THIS INTERSECTION AS STARTING POINT | SMALLEST NO. OF ROAD HAVING THIS INTERSECTION AS END POINT | TRAFFIC SIGNAL? |
|---|---|---|---|---|
| I | KANDA | 1 | 2 | YES |
| II | YUSHIMA | 2 | 1 | YES |
| III | — | 4 | 3 | NO |
| IV | — | 6 | 5 | |

FIG. 5C

| ROAD NO. | STARTING POINT | END POINT | NO. OF ROAD HAVING SAME STARTING POINT | NO. OF ROAD HAVING SAME END POINT | ROAD WIDTH | PROHIBITION ① | PROHIBITION ② | GUIDANCE UNNECESSARY | PHOTOGRAPH NO. | NUMBER OF NODES | LEADING ADDRESS OF NODE SERIES DATA | LENGTH |
|---|---|---|---|---|---|---|---|---|---|---|---|---|
| 1 | I | II | 7 | 4 | 1 | — | — | 3 | 1 | 15 | 100 | |
| 2 | II | I | 3 | 8 | 1 | — | — | 7 | 2 | 13 | 200 | |
| 3 | II | III | 2 | 3 | 2 | — | — | 5 | 3 | 9 | 300 | |
| 4 | III | II | 5 | 6 | 2 | — | — | 2 | 4 | 20 | 500 | |
| 5 | III | IV | 4 | 7 | 2 | 6 | — | 8 | 5 | 25 | 600 | |
| 6 | IV | II | 8 | 1 | 1 | 3 | 2 | — | 6 | 30 | 700 | |
| 7 | I | IV | 1 | 5 | 0 | — | — | — | 7 | 9 | 800 | |
| 8 | IV | I | 6 | 2 | 0 | — | — | 1 | 8 | 3 | 900 | |

FIG. 5D

| ADDRESS | EAST LONGITUDE | NORTH LATITUDE | ATTRIBUTE |
|---|---|---|---|
| | 135.5 | 35.1 | 0 1 |
| | 135.6 | 35.2 | 0 1 |
| 100 | | | |
| 200 | | | |

FIG. 6A

| |
|---|
| INTERSECTION NAME |
| INTERSECTION NO. |
| PHOTOGRAPH NO. |
| ANGLE |
| DISTANCE |
| INTERSECTION NAME |

CHARACTERIZING FEATURE

| | CONNECTING INTERSECTION ① | CONNECTING INTERSECTION ② | DISTANCE FROM CONNECTING INTERSECTION ① |
|---|---|---|---|
| A | I | II | 50 |
| ⋮ | ⋮ | ⋮ | ⋮ |

FIG. 7

| VOICE TRACK NO. | VOICE TRACK CONTENTS |
|---|---|
| 1 | TURN RIGHT IN 10 KIROMETERS |
| 2 | TURN LEFT IN 10 KIROMETERS |
| 3 | TURN RIGHT IN 5 KIROMETERS |
| 4 | TURN LEFT IN 5 KIROMETERS |
| 5 | CONTINUE TRAVELLING AS YOU ARE FOR 5 KIROMETERS |
| 6 | CONTINUE TRAVELLING AS YOU ARE FOR 3 KIROMETERS |
| 7 | YOU WILL CROSS A BRIDGE IN 1 KIROMETER |
| 8 | YOU WILL PASS THROUGH AN UNDERPASS IN 1 KILOMETER |
| 9 | YOU WILL PASS THROUGH A TUNNEL IN 3 KILOMETERS |
| 10 | YOU WILL GO OVER A RAILROAD CROSSING IN 3 KILOMETERS |
| ⋮ | |

NAVIGATION APPARATUS

BACKGROUND OF THE INVENTION

This invention relates to an apparatus for navigating a vehicle in accordance with a course set before travel starts. More particularly, the invention relates to a system for outputting distance information in a navigation apparatus which provides guidance concerning travelling distance at suitable intervals.

Recent years have seen extensive development of vehicular navigation systems in which a course is preset before travel starts and the driver is given course information in accordance with the preset course.

When the driver is guided along the preset course, the conventional navigation apparatus displays a map on the screen of a CRT and superimposes the course on the map. In a case where the navigation apparatus guides the driver to an intersection at which a turn is to be made next in accordance with the preset course, the distance to this intersection is displayed numerically or in the form of a graph. Therefore, when a turn is to be made at an intersection using the conventional navigation apparatus, the driver observes the course displayed on the map to decide the next intersection at which the turn is to be made, or the driver looks at the numeral or graph display to ascertain the distance to the intersection where the turn is to be made, thereby determining the proper intersection.

In recently proposed navigation systems (for example, see the specifications of Japanese Patent Application Laid-Open (KOKAI) Nos. 59-68618, 59-196413, 60-202307, 60-218022), that arrangement is such that when the vehicle approaches an intersection at which the next turn is to be made, the driver is notified of information relating to this intersection by a voice track or visible display.

With the arrangement in which the map and the superimposed course are displayed, it is difficult to ascertain where the present position of the vehicle is on the course superimposed on the map and how far it is to a specific intersection. Moreover, since an intersection at which a turn is to be made next must be judged by looking at the course on the map, considerable attention is required in order to indentify the intersection, even if the intersection is nearby.

With the arrangement using numerals or a graph to display the distance to the intersection at which a turn is to be made, the driver cannot take his eyes off the road to view the display screen for an extended period of time while in the act of driving, and the driver therefore is constrained to glance at the display screen for short durations only. However, it is difficult to understand at once what is being displayed merely by a short glance at the screen.

Furthermore, with the system that notifies the driver of intersection information by voice or display when the vehicle has approached the pertinent intersection, no course guidance is given until this intersection has drawn near. Consequently, if the distance between one intersection at which a turn has been made and the intersection at which the next turn is to be made is great, absolutely no guidance relating to course is provided for an extended period of time and over a long distance. In such case the driver cannot verify whether the vehicle is travelling correctly in accordance with the preset course. The result is driver anxiety.

SUMMARY OF THE INVENTION

Accordingly, an object of the present invention is to provide a navigation apparatus in which a driver is constantly given course guidance information at an appropriate timing so that the flow of such information will not cease for an extended period of time.

Another object of the invention is to provide a navigation apparatus capable of supplying a driver with course guidance in such a manner that the driver will not experience anxiety with regard to whether he is following a course correctly.

In accordance with the invention, the foregoing objects are attained by providing a navigation apparatus for navigating in accordance with a preset course while measuring distance travelled and steering angle, characterized by presetting distance information for guidance along the course, and outputting guidance relating to pertinent distance information in the form of travelling conditions corresponding to the preset distance information.

In accordance with the invention as described above, distance information for guiding a driver along the course is preset. Therefore, even if it is a long distance up to the intersection at which the next turn is to be made, whenever the vehicle has travels a fixed distance the driver is unfailingly supplied with distance information relating to the intersection at which the next turn is to be made and with distance information relating to distinguishing features seen along the course, such as facilities and scenery, during the time the vehicle is travelling between the intersections. Thus, in a case where a long distance must be travelled to reach the intersection at which the next turn is to be made, the driver is frequently supplied with guidance relating to distance information while travelling. This makes it possible for the driver to verify the course and assures that the driver can drive the vehicle at ease without requiring that he be aware of the distance to the intersection at which the next turn is to be made.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 5A through 5D are views illustrating an example of basic data for creating navigation data;

FIGS. 6A and 6B are views illustrating an example of route data and characterizing feature data constituting navigation data; and FIG. 7 is a view illustrating an example of a voice track list.

DESCRIPTION OF THE PREFERRED EMBODIMENT

An embodiment of the present invention will now be described with reference to the drawings.

Figure 1:
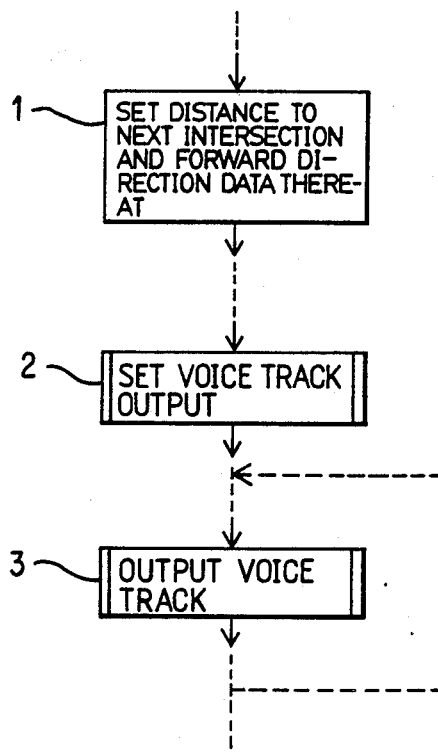
FIG. 1 is a flowchart for describing an embodiment in a case where the outputting of distance information in the navigation apparatus of the invention is performed by voice tracks.

As shown in FIG. 1, a method of outputting distance information in a navigation apparatus according to the invention initially entails setting the distance to the next intersection as well as the direction of advance from this intersection [ ], followed by setting a voice track number of a voice track to be outputted first as well as a voice track output distance [②]. The voice track number indicates the location of the raw data of the corresponding voice track in a memory. Voice tracks which have thus been set in succession are outputted in succession up to the next intersection as the vehicle travels [③].

Figure 2:
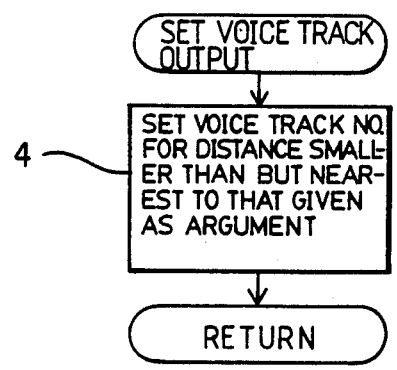
FIG. 2 is a flowchart illustrating the flow of processing for a voice track setting routine.

In the foregoing processing, the routine [②] for setting the voice track number of the voice track to be outputted includes giving distance and direction of forward movement as arguments to this routine, and the setting of the voice track number of a voice track for the shortest distance within the abovementioned distance, as well as the voice track output distance, is shown at [④] in FIG. 2.

Figure 3:
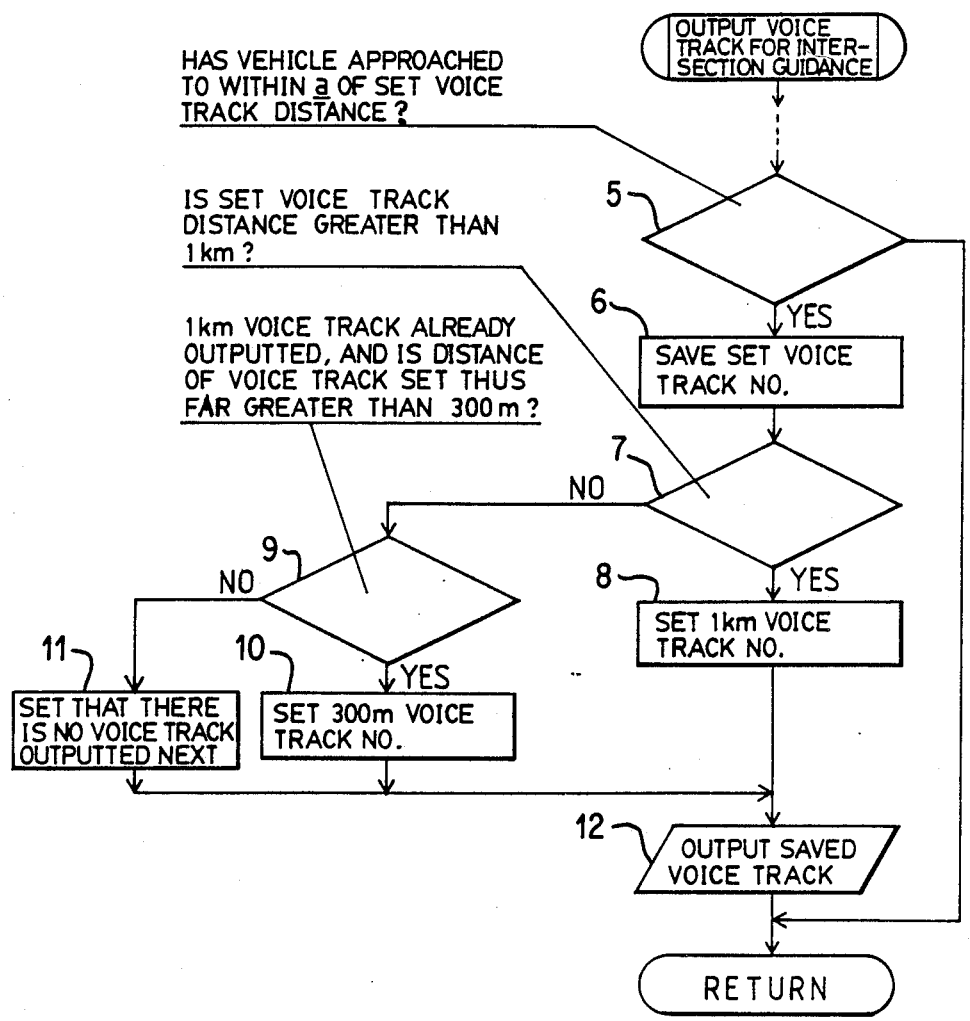
FIG. 3 is a flowchart illustrating the flow of processing for a voice track output routine.

In the foregoing processing, the routine [③] for outputting the voice track is as shown in FIG. 3. When the vehicle approaches the distance of the set voice track and arrives within a meter (a threshold value) of this distance, the set voice track number is saved at this time [⑤,⑥] and the voice track number to be outputted next is set [⑦ through ⑪]. Thereafter, the voice track corresponding to the voice track number already saved is outputted [⑫].

By way of example, if 5.2 km is set as the distance to the next intersection at step [①] in FIG. 1, first a 5 km voice track number is set at step [④] in FIG. 2. When the vehicle approaches the 5 km mark and the remaining distance up to the 5 km mark falls within the threshold value a (meters), the 5 km voice track signal is saved at steps [⑤,⑥] and a 1 km voice track signal is set at steps [⑦,⑧] as the number of the voice track outputted next. The voice track corresponding to the 5 km voice track number is outputted at step [⑫]. Thereafter, a 300 m voice track number is set at steps [⑦,⑨,⑩], and the voice tracks corresponding to 1 km and 300 m voice track numbers are successively outputted at step [⑫].

If the distance to the intersection at which the next turn is to be made is great, voice tracks reciting "TURN RIGHT IN 10 KILOMETERS", "TURN RIGHT IN 5 KILOMETERS" or the like can be outputted. In this way distance and direction to the intersection at which the next turn is to be made are announced in accordance with the the remaining distance.

Figure 4:
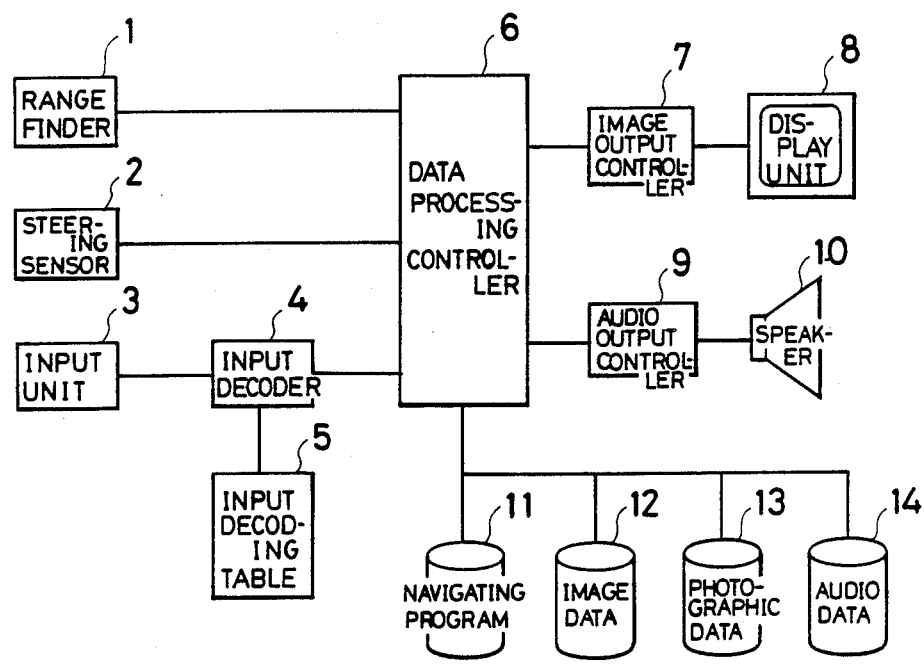
FIG. 4 is a block diagram illustrating an example of the structure of a navigation system to which the distance information output method of the inventive navigation apparatus is applied.

FIG. 4 illustrates an example of the system configuration of a navigation apparatus which performs the above-described course guidance.

In FIG. 4, the arrangement includes a range finder 1, a steering angle sensor 2, an input unit 3, an input decoder 4, an input decoding table 5, a data processing controller 6, an image output controller 7, a display unit 8, an audio output controller 9, a speaker 10 and files 11 through 14.

The range finder 1 measures the distance travelled by an automotive vehicle. Examples of the range finder 1 include means for detecting and counting the number of revolutions of a wheel, means for detecting acceleration and double-integrating the result, etc. Other measuring means may also be employed. The steering sensor 2 senses whether the vehicle has turned at an intersection. By way of example, the steering sensor 2 employs an optical rotary sensor or a rotating-type variable resistor attached to a rotating part of the steering wheel. The input unit 3 is a joy stick, key or touch-type panel. Alternatively, the input unit 3 can be interlocked with the screen of a display unit 8, and a key or menu can be displayed on the screen to enable inputs to be made from the screen. The input decoder 4 is adapted to decode input data from the input unit 3 while referring to the input decoding table 5. When a course is to be set, for example, the present location of the vehicle and the destination are inputted in the form of codes, whereupon the input decoder 4 effects a conversion into present location data and destination data based on the codes by referring to the input decoding table 5. Accordingly, the input decoding table 5 is set in accordance with the data inputted from the input unit 3. The data processing controller 6 is the brain of the navigation system. When a course has been selected and set at the input unit 3, the controller 6 calls and executes navigation data for this course from the file 11 storing the data. Each item of navigating data is designed to display an information map, which is in line with the course travelled, on the screen of the display unit 8, project characteristic photographs at intersections and at points along the course, display remaining distances to intersections as well as other guidance information, and give audible information in the form of voice tracks broadcast from the speaker 10. These images, photographs and audio data are stored in files 12 through 14, respectively. The outputting of images to the display unit 8 is controlled by the image output controller 7, and the outputting of audio to the speaker 10 is controlled by the audio output controller 9.

Figure 5A:
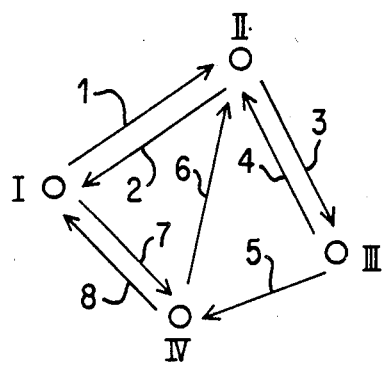

As an example, assume that a road network comprises intersection numbers I–IV and road numbers –⑧, as shown in FIG. 5A. In such case, the intersection data will have the data configuration shown in FIG. 5B, the road data will have the data configuration shown in FIG. 5C, and the node series data will have the data configuration shown in FIG. 5D.

As shown in FIG. 5B, the intersection data comprises intersection names corresponding to the intersections numbers I–IV, road numbers having the smallest numbers among those roads possessing a certain intersection as a starting point, road numbers having the smallest numbers among those roads possessing a certain intersection as an end point, and information indicating whether or not a certain intersection has a traffic signal.

As shown in FIG. 5C, the road data comprises starting and end points, in the form of intersection numbers, of the road numbers  through  , the numbers of roads having the same starting point, the numbers of roads having the same end point, road width, information relating to prohibitions, information relating to guidance not required, photograph numbers, the numbers of nodes, the leading addresses of node series data, length, etc.

As shown in FIG. 5(D), the node array data comprises information relating to east longitude, north latitude, attributes and the like. The units of the road numbers comprise a plurality of nodes, as is evident from the road data. More specifically, the node data is data relating to one point on a road. If a line connecting nodes is referred to as an arc, a road is expressed by connecting each of a plurality of node arrays by arcs. For example, with regard to road number , the road comprises 15 nodes and the leading address of the node array data is 100, based on the road data. Therefore, road number is composed of node data having addresses 100 to 114.

Figure 6B:

Let us take intersection number I as an example. For a course having this intersection as a starting point, first road number ① is retrieved from the starting point information of the intersection point data, then road number ⑦ is retrieved from the road data relating to the road number ①, namely from the column reading "NO. OF ROAD HAVING SAME STARTING POINT". Since the same information for road number ⑦ will, in converse fashion, lead to retrieval of road number ①, one can determine that there are no other road numbers available as peripheral roads. The same will hold true with regard to end points. Further, since road number ⑥ will be prohibited in case of road number ⑤ in the road data, the vehicle will not be able to enter road number ⑥ from road number ⑤ at the intersection number IV because turns are prohibited at this intersection. The only road that can be entered is the road number ⑧. Accordingly, guidance to road number ⑧ is unnecessary. By providing the road data with road numbers indicative of roads that cannot be entered because of prohibited turns and road numbers indicative of roads for which guidance is not required, the necessary information storage capacity can be reduced and route retrieval can be facilitated. By relying upon such data, peripheral roads from an intersection (with the exception of roads for which entry is forbidden because of prohibited turns or the like) are retrieved, road width, the need or lack of need for guidance and other conditions necessary for computing an ideal route are set, and the optimum route from the designated starting point to the destination is retrieved. In accordance with the retrieved ideal route, route data shown in FIG. 6A and characterizing feature data shown in FIG. 6B are created as navigation data. The route data comprises the intersections, in order of nearness, from the starting point to the destination along the retrieved optimum route. The characterizing feature data relates to the characterizing features between intersections.

In accordance with the above-described navigation system, the driver selects a course by entering his present location and desired destination from the input unit 3 before travelling. When this has been accomplished, the data processing controller 6 reads and executes the navigating program in file 1 corresponding to this course. In accordance with the course, and on the basis of the measurement information from the range finder 1 and steering sensor 2, the aforementioned execution of the data determines the present vehicle location, displays the course information map, and the like, and informs the driver of characteristic features and intersections along the route, via the display unit 8 and speaker 10. Distance information is outputted in the form of images and voice tracks by applying the distance information output method used in the navigation apparatus of the present invention, as described above. Furthermore, in order to assure the driver that he has not strayed off the course when the distance between intersections is great, for example, the driver may be informed by voice of characterizing features being passed, such as by a voice track reciting "YOU WILL SOON CROSS A BRIDGE", or a photograph of the characterizing feature being passed may be projected on the display screen. The navigation data includes which data are to be used under what conditions, these data being taken from the files 12 through 14 storing the data for the abovementioned input outputs and the data for the voice track outputs. An example of a voice track list is as shown in FIG. 7.

The present invention is not limited to the embodiment described above but can be modified in various ways. For example, though the distance to an intersection is indicated by a voice track in the foregoing embodiment, this can be indicated by displaying the distance using a display screen. Further, it can be arranged so that if the distance from one intersection at which a turn has been made to the next intersection at which a turn is to be made is great, an indication is given to the effect that the driver should continue travelling straight ahead for a while after having made the turn at the first-mentioned intersection. This can be accomplished by giving the messages "CONTINUE TRAVELLING AS YOU ARE FOR 5 KILOMETERS", "CONTINUE TRAVELLING AS YOU ARE FOR 4 KILOMETERS" and so on right after the turn at the first-mentioned intersection. Also, if there are public facilities such as buildings and characterizing scenery along the route to the intersection at which the next turn is to be made, it is permissible to output a characterizing feature and the distance thereto as information in the form of a message such as "YOU WILL CROSS A LARGE BRIDGE IN 1 KILOMETER" before the distance to the intersection is indicated. Outputting these indications makes it possible for the driver to confirm the course during the time that the vehicle is travelling toward the intersection at which the next turn will be made.

Thus, in accordance with the present invention as set forth above, a driver's mind is put at ease since guidance to a subsequent intersection is provided immediately after a turn is made at the preceding intersection. Furthermore, if the distance to the next intersection is great, guidance is provided at a number of points along the way so that the driver may drive the vehicle without it being required that he constantly be aware of the distance. If there is a long distance to the intersection at which the next turn is to be made, an indication to the effect that the driver should continue travelling on the present road, or an indication of a characterizing feature that will eventually come into view upon further travel, is provided immediately after a turn. As a result, the driver may drive the vehicle at ease since he is capable of verifying whether the course being followed is correct.

DESCRIPTION OF APPENDIX

The attached material is an example of specific navigation data in C language to which the present invention is applied. For example:

a is a step for setting the distance to the next intersection, namely a step corresponding to the processing of step ① shown in FIG. 1;

b is a step for setting forward direction data at the next intersection (see step ① of FIG. 1);

c is a step for setting voice tracks to be outputted (see step ② of FIG. 1);

d is a voice track output step (see step ③ of FIG. 1);

e is a routine for setting voice tracks to be outputted (see FIG. 2); and f is a voice track output routing (see FIG. 3).

APPENDIX (A)

```
unsigned gnocal()
{   int def;    unsigned retd;

if(GUIDNO<NNVD-1) {
        GUIDNO=ARIV+1;                    a
        RESTD=NVD[GUIDNO].restd;

tirqmsk(1); printf("ANGLE NVD=%d  CURB=%d  DEF=%d    FCURB=%d¥n"
        ,NVD[GUIDNO-1].angle,RANGLE,abs(NVD[GUIDNO-1].angle-RANGLE),FCURB)
tirqmsk(0);
tirqmsk(1); printf("ANGLE HANI:F=%d   R=%d¥n",PHANIF,PHANIR);             tirqmsk(0)
tirqmsk(1); printf("NVD[].restd    = %7d¥n",RESTD );                      tirqmsk(0);
tirqmsk(1); printf("NVD curb.angle = %7d¥n",NVD[GUIDNO-1].angle) ; tirqmsk(0);
        retd=RESTD-20;
        if(RESTD>CURBADJ)    RESTD-=CURBADJ;
tirqmsk(1) ; printf ("CURBADJ       =%7d¥n",CURBADJ); tirqmsk(0);
tirqmsk(1) ; printf ("RESTD         =%7d¥n",RESTD);   tirqmsk(0);
tirqmsk(1) ; printf ("Ariv          =%7d¥n",ARIV);    tirqmsk(0);
        CURBADJ=0;
        FCHGNV=0;

if(FIGON){
        tirqmsk(1);
            while((def=(RESTD-FRESTD))>0) {
                if(def>22)   DDEMO=51;
                else         DDEMO=2;
                tirqmain();
                WdTimer();
            }
            FIGON=0;
            DDEMO=0;
        }
        tirqmsk(0) ;
    }
    return((unsigned)retd);
}
                                        /* Guidance to next intersection */
int nxtguid(gno,nnvd,nvd,restd,drc d100m)
int gno;
unsigned nnvd;
```

APPENDIX (B)

```
struct nvd *nvd;
unsigned *restd;
int *drc;
unsigned d100m;
{
    int ret;
    char cname[100];
    int frmno,frm[3][2][2];
    /*unsigned char *frmbuf[3];*/
    int bcolor=0;           char btxt[30];
    unsigned vdist=0;           int vtrack=0;
    int pctno,angle:
    int f=0;

pctno=nvd->pctno[0];          b
    angle=nvd->angle;
    strcpy(cname,&(nvd->name[01]));
    GUIDSW=0;
    tirqmsk(1);

/*  printf("Nxt Guid GUIDNO %d :  nnvd %d¥n",GUIDNO,nnvd);
    printf("Nxt Guid ARIV   %d¥n",ARIV);    tirqmsk(0);*/ if(ARIV==0) {
        while(*restd>d100m) {
            ret=intnvl();
            if(ret<=RETRESET)     return(ret);
        }
    }
    if(GUIDNO!=nnvd-1) {
        if(0!=(ret=nxtcrs(gno,cname,*restd,(drc+(GUIDNO-1)*256),pctno,
        &frmno,frm))) {
/*      &frmno,frm,frmbuf))) {*/
            if(ret<=RETRESET)
                return(ret);
            else {
                return -1;
            }
        }
    }
```

APPENDIX (C)

```
    else {
        if(0!=(ret=neartarg(gno,cname,angle,pctno,*restd))) {
            if(ret<=RETRESET)
                return(ret);
            else    return -1;
        }
        frmno=0;     /*frm=NULL; frmbuf=NULL; */
        f=1;
    }                                                              C
}
                                        /* Setting of voice track guidance track*/
    setvoice(f, *restd angle, &vdist, &vtrack);

/*  tirqmsk(1);
    printf(" Vdist %d   Vtrack %d SET¥n",vdist,vtrack); */

/* Guidance during travel*/
    bcolor=0;
    setmem(btxt, 16, 0x00);

while(FCHGNV==0) {
        if(0!=(ret=runguid(gno,0,*restd,&bcolor,btxt  frmno, frm))) {
/*      if(0!=(ret=runguld(gno,0,*restd,&bcolor,btxt  frmno, frm, frmbuf))) { */
            if(ret<=RETRESET) {
                if (FVDSP==0)
                {    tirqmsk(1);
                    if(FPOS==0) FPOS=1;
                    while(1)
                    {   if(FVDSP==1) {FPOS=0;   break;}
                        tirqmain();
                    }
                    tirqmsk(0);
                }
                else
                    FPOS=0;
/*              rlsfrm(frmno, frm, frmbuf);*/
                return(ret);
            }
```

APPENDIX (D)

```
                                                                   d
        if(vdist) {
            tirqmsk(1);
            playvoice(*restd,&vdist,&vtrack,f, angle);
            tirqmsk(0);
        } if(FVOICE&&(CVOICE>(VOICETIME/TIR_TIME))) {
            tirqmsk(1);
            cdready(0);
            tirqmsk(0);
/*          tirqmsk(1); printf("KILL Voice¥n"); tirqmsk(0);*/
            FVOICE=0;
        }
    }
/*  rlsfrm(frmno,frm,frmbuf);*/ return 0;
}

/*
rlsfrm(frmno,frm,frmbuf)
int  frmno, frm[ ][2][2];
unsigned  char  *frmbuf[ ];
{
    cdready(0);
    if(-1==frmrlsmem(frmno, frm, frmbuf)) {
        tirqmsk(1);
        printf("RESET FRM MEM ERROR¥n");
        tirqmsk(0);
        return -2;
    }
    return 0;
}*/
```

APPENDIX(E)

```
/*
    Obtain remaining distance (from RESTD) for guidance
    Set to VOICEDST
    Set guidance voice track NO. to VOICETRACK
    LEADING:    RUNNING( )
*/
/*#include "voice.vns"*/
#include "nv.vns"
#include "guidreco.nh"
#include "extern.nh"
#define NVOICE  9
#define VDELTA  10
```

```
int setvoice(arriv,restd,angle,vdist,vtrack)
    int arriv;
    int angle; /*NVD[GUIDNO].angle*/
    unsigned restd; /*RESTD*/
    unsigned *vdist;
    int *vtrack;
{   int i;

static unsigned voicedist[9]=
        {  100,   200,   300,   500,  1000,  2000,  3000,  5000, 10000};
    static char voiceleft[9]={  24, 25, 26, 27, 28, 29, 30, 31, 32,};
    static char voiceright[9]={ 49, 50, 51, 52, 53, 54, 55, 56, 57,};
    static char voicearriv[9]={ 59, 60, 61, 62, 63, 64, 65, 66, 67};

for(i=0;i<NVOICE;i++)       if(restd<voicedist[i])  break;

if(i==0)        *vdist=voicedist[0];
    else            *vdist=voicedist[--i];
    if(arriv)           *vtrack=voicearriv[i];
    else if(angle<0)    *vtrack=voiceright[i];
    else if(angle>0)    *vtrack=voiceleft[i];
    else            {   *vdist=0;   return -1;  }
    return 0;
}
```

APPENDIX(F)

```
int playvoice(restd,vdist,vtrack,f,angle)
unsigned restd;
unsigned *vdist;
int *vtrack;
int f;
int angle;
{   static long count;
    static int once=0;
    int b;
    if(*vdist==0)   return 0;
    if(restd<(*vdist+VDELTA)) {
        if(play_i(-2)!=0) {
            if(count>1000)  play_i(-1);
            else            count++;
        }
        else {
            pippi();
            b=*vtrack;
            if(*vdist>1000) {
                once=1;
                setvoice(f,1000+50,angle,vdist,vtrack);
            }
            else if(*vdist>300 && once)
                setvoice(f,300+50,angle,vdist,vtrack);
            else {
                *vdist=0;
                once=0;
            }
            play_i(b);
            count=0;
            CVOICE=0;
            FVOICE=1;
        }
    }
    return 0;
}
```

What we claim is:

1. A navigation apparatus for a vehicle comprising:
a map data base;
departure point input means for inputting a departure point;
destination point input means for inputting a destination point;
course forming means for retrieving a course between said departure point and said destination point based upon said map data base and for forming course data indicative of said retrieved course;
distance sensor means for providing a signal indicative of a vehicle travel distance;
steering sensor means for providing a signal indicative of a vehicle steering angle;
present position detection means for detecting a present position of said vehicle based upon said signals received from said distance sensor and said steering sensor; and
guide information output means for receiving data concerning a distance between intersections where said vehicle should turn; determining based on said distance a point at which guide information is to be issued; and outputting said guide information when said present position coincides with said point.

2. A navigation apparatus according to claim 1, wherein said guide information is information concerning a distance between said present position and said intersection where said vehicle should turn.

3. A navigation apparatus according to claim 1, wherein said guide information is outputted by at least one of voice and display means.

4. A navigation apparatus according to claim 2, wherein said guide information is outputted by at least one of voice and display means.

5. A navigation apparatus for a vehicle comprising:
a map data base;
departure point input means for inputting a departure point;
destination point input means for inputting a destination point;
course forming means for retrieving a course between said departure point and said destination point based upon said map data base and for forming course data indicative of said retrieved course;
distance sensor means for providing a signal indicative of a vehicle travel distance;
steering sensor means for providing a signal indicative of a vehicle steering angle;
present position detection means for detecting a present position of said vehicle based upon said signals received from said distance sensor and said steering sensor; and
guide information output means for receiving from said course data a distance between intersections where said vehicle should turn; setting based on said distance a predetermined distance from an intersection where said vehicle should turn; computing remaining distance between said present position and said intersection; and outputting guide information when said remaining distance equals said predetermined distance.

6. A navigation apparatus according to claim 5, wherein said guide information is information concerning a distance between said present position and said intersection where said vehicle should turn.

7. A navigation apparatus according to claim 5, wherein said guide information is outputted by a at least one of voice and display means.

8. A navigation apparatus according to claim 6, wherein said guide information is outputted by at least one of voice and display means.

9. A navigation apparatus according to claim 5, wherein said guiding means sets said predetermined distance from a plurality of predetermined guidance distances each representing a different distance.

10. A navigation apparatus according to claim 9, wherein said guiding means firstly sets a first distance from said plurality of predetermined guidance distances.

11. A navigation apparatus according to claim 10, wherein said guiding means secondly sets a second distance from said predetermined guidance distances.

12. A navigation apparatus for a vehicle comprising:
input means for inputting a departure point and a destination point;
distance sensor means for detecting travel distance of said vehicle;
steering sensor means for detecting vehicle steering angle;
output means for providing guidance information;
memory means having a map data base including intersection and road data; and
controller means for reading said memory means, receiving signals from said input means, said distance sensor means and said steering sensor means, and outputting said guidance information to said output means, said controller means including:
(a) course setting means for setting a course between said departure point and said destination point in accordance with said intersection and road data;
(b) present position means for determining present position of said vehicle based upon said signals received from said distance sensor and said steering sensor; and
(c) guiding means for reading travel distance to a next turning intersection from said course setting means, selecting a guidance distance based on said travel distance to a next turning intersection; and providing said guidance information to said output means, when said present position means detects that said present position coincides with said guidance distance.

13. A navigation apparatus according to claim 12, wherein said guidance information is distance information concerning a distance between said present position and said next turning intersection.

14. A navigation apparatus according to claim 13, wherein said guiding means selects said guidance distance from a plurality of predetermined guidance distances each representing a different distance.

15. A navigation apparatus according to claim 14, wherein said guiding means firstly sets a first distance from said plurality of predetermined guidance distances.

16. A navigation apparatus according to claim 15, wherein said guiding means secondly sets a second distance from said predetermined guidance distances.

* * * * *